(12) United States Patent
Vogman

(10) Patent No.: US 8,564,989 B2
(45) Date of Patent: Oct. 22, 2013

(54) COLD SWAP LOAD ADAPTIVE POWER SUPPLY

(75) Inventor: Viktor Vogman, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 12/928,907

(22) Filed: Dec. 22, 2010

(65) Prior Publication Data

US 2012/0163051 A1    Jun. 28, 2012

(51) Int. Cl.
    *H02J 1/10* (2006.01)
(52) U.S. Cl.
    USPC .............................. 363/65; 323/207; 323/283
(58) Field of Classification Search
    USPC ......... 363/16–20, 25, 71, 80, 81, 97, 98, 132;
        323/222, 224, 266, 267, 271, 272, 323/282–285; 713/300, 320, 322, 500, 501; 307/29, 30, 64, 66, 86
    See application file for complete search history.

(56) References Cited

U.S. PATENT DOCUMENTS

| | | | |
|---|---|---|---|
| 5,530,635 A * | 6/1996 | Yashiro | 363/65 |
| 6,018,472 A | 1/2000 | Vogman | |
| 6,066,942 A | 5/2000 | Massie et al. | |
| 6,265,790 B1 | 7/2001 | Vogman | |
| 6,487,093 B1 | 11/2002 | Vogman | |
| 6,495,995 B2 * | 12/2002 | Groom et al. | 323/283 |
| 6,628,013 B2 | 9/2003 | Vogman | |
| 6,704,211 B1 | 3/2004 | Vogman | |
| 6,747,369 B2 | 6/2004 | Griffith et al. | |
| 7,064,530 B2 | 6/2006 | Vogman | |
| 7,162,656 B2 | 1/2007 | Vogman | |
| 7,173,831 B1 | 2/2007 | Vogman | |
| 7,368,897 B2 | 5/2008 | Qahouq et al. | |
| 7,492,134 B2 * | 2/2009 | Tang et al. | 323/241 |
| 7,492,171 B2 | 2/2009 | Vogman | |

(Continued)

FOREIGN PATENT DOCUMENTS

| | | |
|---|---|---|
| WO | 2012087618 A2 | 6/2012 |
| WO | 2012/087618 A3 | 10/2012 |

OTHER PUBLICATIONS

International Search Report and Written Opinion mailed Jul. 30, 2012, for PCT Application No. PCT/US2011/064226, 9 pages.

(Continued)

*Primary Examiner* — Rajnikant Patel
(74) *Attorney, Agent, or Firm* — Jordan IP Law, LLC

(57) ABSTRACT

In some embodiments, a power supply may include a power factor correction (PFC) circuit to receive an input voltage signal and to provide an intermediate PFC output voltage signal, the PFC circuit including at least a first PFC stage and a second PFC stage, a converter circuit to convert the intermediate PFC output voltage signal to an output voltage signal, the converter circuit including at least a first converter stage and a second converter stage, and a control circuit to monitor at least one of the input voltage signal, the intermediate PFC output voltage signal, and the output voltage signal and to switch between respective pairs of the first PFC stage and first converter stage and the second PFC stage and the second converter stage based on the monitored signals. For example, the first PFC stage and first converter stage may provide relatively more efficient performance over a first output power range and the second PFC stage and second converter stage may provide relatively more efficient performance over a second output power range. Other embodiments are disclosed and claimed.

21 Claims, 9 Drawing Sheets

(56) References Cited

U.S. PATENT DOCUMENTS

| | | | |
|---|---|---|---|
| 7,567,134 B2 * | 7/2009 | Cohen et al. | 331/45 |
| 7,667,447 B2 | 2/2010 | Huang et al. | |
| 7,696,764 B2 | 4/2010 | Vogman | |
| 8,068,355 B1 * | 11/2011 | Ikriannikov et al. | 363/25 |
| 8,120,334 B2 * | 2/2012 | Valley et al. | 323/222 |
| 8,193,796 B2 | 6/2012 | Tang et al. | |
| 8,294,438 B2 * | 10/2012 | Wickersham et al. | 323/237 |
| 2002/0036431 A1 | 3/2002 | Vogman | |
| 2004/0036359 A1 | 2/2004 | Griffith et al. | |
| 2004/0193926 A1 | 9/2004 | Vogman | |
| 2005/0219865 A1 | 10/2005 | Vogman | |
| 2007/0013350 A1 | 1/2007 | Tang et al. | |
| 2007/0080671 A1 | 4/2007 | Qahouq et al. | |
| 2007/0145962 A1 | 6/2007 | Huang et al. | |
| 2008/0018402 A1 | 1/2008 | Vogman | |
| 2009/0167330 A1 | 7/2009 | Vogman | |
| 2009/0174257 A1 | 7/2009 | Li et al. | |
| 2009/0224731 A1 | 9/2009 | Tang et al. | |
| 2010/0052426 A1 | 3/2010 | Carter et al. | |
| 2010/0077238 A1 | 3/2010 | Vogman et al. | |
| 2010/0165668 A1 | 7/2010 | Lin | |
| 2010/0169690 A1 | 7/2010 | Mundada et al. | |
| 2010/0332857 A1 | 12/2010 | Vogman | |
| 2011/0078479 A1 | 3/2011 | Vogman | |

OTHER PUBLICATIONS

"Day 2 News Highlights At Intel Developer Forum", News Fact Sheet, Intel Corporation, Apr. 3, 2008, 4 pages.

* cited by examiner

COLD SWAP LOAD ADAPTIVE POWER SUPPLY

The invention relates to power supplies and more particularly to a cold swap load adaptive power supply.

BACKGROUND AND RELATED ART

U.S. Patent Publication Nos. 20070013350 and 20090224731 describe a multiphase power regulator with load adaptive phase control.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
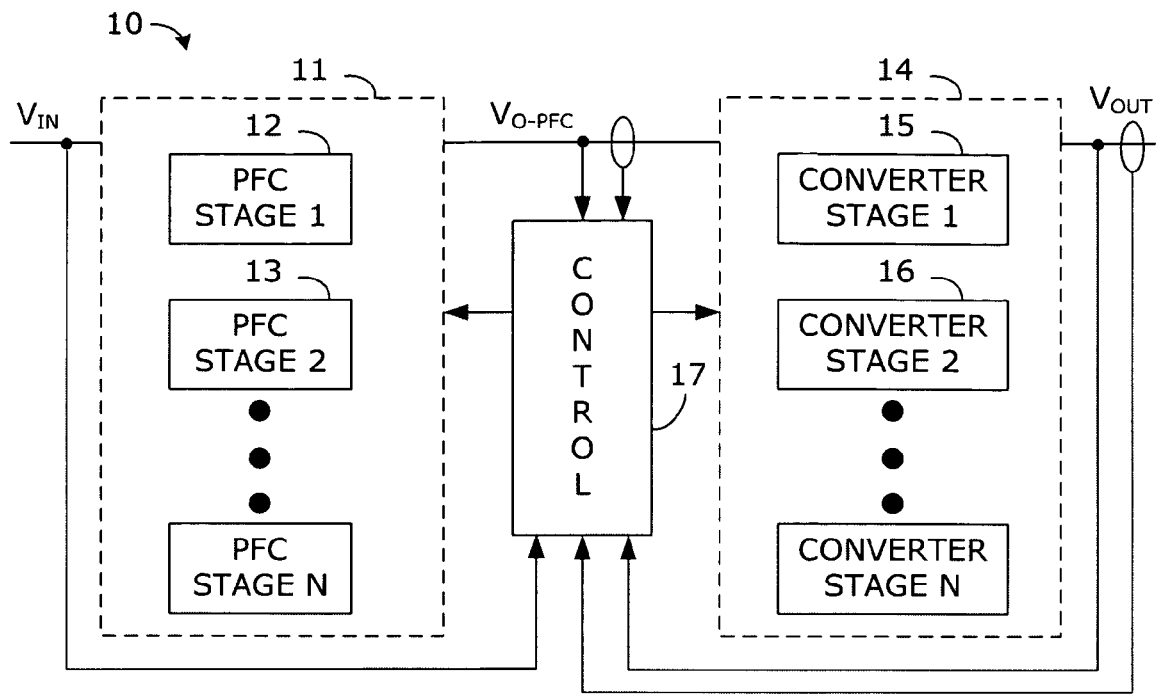
FIG. 1 is a block diagram of a power supply in accordance with some embodiments of the invention.

With reference to FIG. 1, in accordance with some embodiments of the invention a power supply 10 may include a power factor correction (PFC) circuit 11 to receive an input voltage signal and to provide an intermediate PFC output voltage signal. The PFC circuit 11 may include at least a first PFC stage 12 and a second PFC stage 13 (e.g. through N−2 additional PFC stages). A converter circuit 14 may convert the intermediate PFC output voltage signal to an output voltage signal. The converter circuit 14 may include at least a first converter stage 15 and a second converter stage 16 (e.g. through N−2 additional converter stages). A control circuit 17 may monitor at least one of the input voltage signal, the intermediate PFC output voltage signal, and the output voltage signal. The control circuit 17 may switch between respective pairs of the first PFC stage and first converter stage and the second PFC stage and the second converter stage based on the monitored signals (e.g. up through N−2 additional pairs of matched PFC stages and converter stages). In accordance with some embodiments of the invention, the paired first PFC stage and first converter stage may provide relatively more efficient performance over a first output power range and the paired second PFC stage and second converter stage may provide relatively more efficient performance over a second output power range.

For example, the first PFC stage 12 may correspond to a low power PFC stage, the second PFC stage 13 may correspond to a high power PFC stage, and the control circuit 17 may include a PFC stage control circuit coupled to the intermediate PFC output voltage signal and to a first sensor to monitor the PFC stage output current. The PFC stage control circuit may be configured to switch between the low power PFC stage and the high power PFC stage based on an output of the first sensor and a first threshold signal.

For example, the converter circuit 14 may include a direct current to direct current (DC/DC) converter and the first converter stage 15 may correspond to a low power DC/DC stage. The second converter stage 16 may correspond to a high power DC/DC stage. The control circuit 17 may include a DC/DC stage control circuit coupled to the output voltage signal and to a second sensor to monitor the DC/DC stage output current. The DC/DC stage control circuit may be configured to switch between the low power DC/DC stage and the high power DC/DC stage based on an output of the second sensor and a second threshold signal. In some embodiments of the invention, the DC/DC stage control circuit may be configured to disable the high power DC/DC stage when the low power DC/DC stage is active and to disable the low power DC/DC stage when the high power DC/DC stage is active.

In some embodiments of the invention, the low power DC/DC stage may share filter components with the high power DC/DC stage. In some embodiments of the invention, the low power DC/DC stage may share a heatsink with the high power DC/DC stage. For example, the low power DC/DC stage may include a first output filter inductor, the high power DC/DC stage may include a second output filter inductor, and the first and second output filter inductors may be configured to be magnetically coupled to each other.

Figure 2:
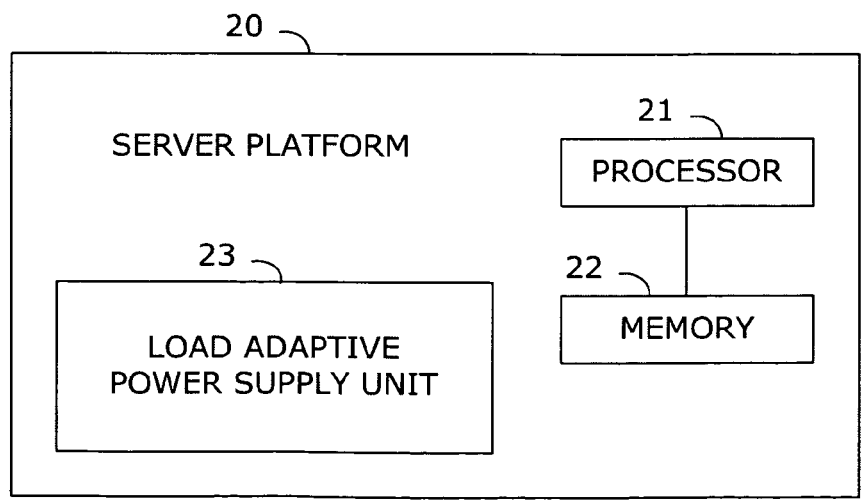
FIG. 2 is a block diagram of a server system in accordance with some embodiments of the invention.

With reference to FIG. 2, in accordance with some embodiments of the invention a server system 20 may include a processor 21 having at least one processor core, memory 22 in communication with the processor, and a load adaptive power supply unit 23 to provide power to the server system 20. For example, the load adaptive power supply unit may include a PFC circuit to receive an input voltage signal and to provide an intermediate PFC output voltage signal, the PFC circuit including at least a first PFC stage and a second PFC stage, a converter circuit to convert the intermediate PFC output voltage signal to an output voltage signal, the converter circuit including at least a first converter stage and a second converter stage, and a control circuit to monitor at least one of the input voltage signals, the intermediate PFC output voltage signal, and the output voltage signal and to switch between respective pairs of the first PFC stage and first converter stage and the second PFC stage and the second converter stage based on the monitored signals. For example, the paired first PFC stage and first converter stage may provide relatively more efficient performance over a first output power range and the paired second PFC stage and second converter stage may provide relatively more efficient performance over a second output power range.

For example, in some server systems 20 the first PFC stage may correspond to a low power PFC stage, the second PFC stage may correspond to a high power PFC stage, and the control circuit may include a PFC stage control circuit coupled to the intermediate PFC output voltage signal and to a first sensor to monitor the PFC stage output current. The PFC stage control circuit may be configured to switch between the low power PFC stage and the high power PFC stage based on an output of the first sensor and a first threshold signal.

For example, in some server systems 20 the converter circuit may include a DC/DC converter and the first converter stage may correspond to a low power DC/DC stage. The second converter stage may correspond to a high power DC/DC stage. The control circuit may include a DC/DC stage control circuit coupled to the output voltage signal and to a second sensor to monitor the DC/DC stage output current. The DC/DC stage control circuit may be configured to switch between the low power DC/DC stage and the high power DC/DC stage based on an output of the second sensor and a second threshold signal. In some embodiments of the invention, the DC/DC stage control circuit may be configured to disable the high power DC/DC stage when the low power DC/DC stage is active and to disable the low power DC/DC stage when the high power DC/DC stage is active.

In some embodiments of the server system 20, the low power DC/DC stage may share filter components with the high power DC/DC stage. In some embodiments of the server system 20, the low power DC/DC stage may share a heatsink with the high power DC/DC stage. For example, the low power DC/DC stage may include a first output filter inductor, the high power DC/DC stage may include a second output filter inductor, and the first and second output filter inductors may be configured to be magnetically coupled to each other.

Figure 3:
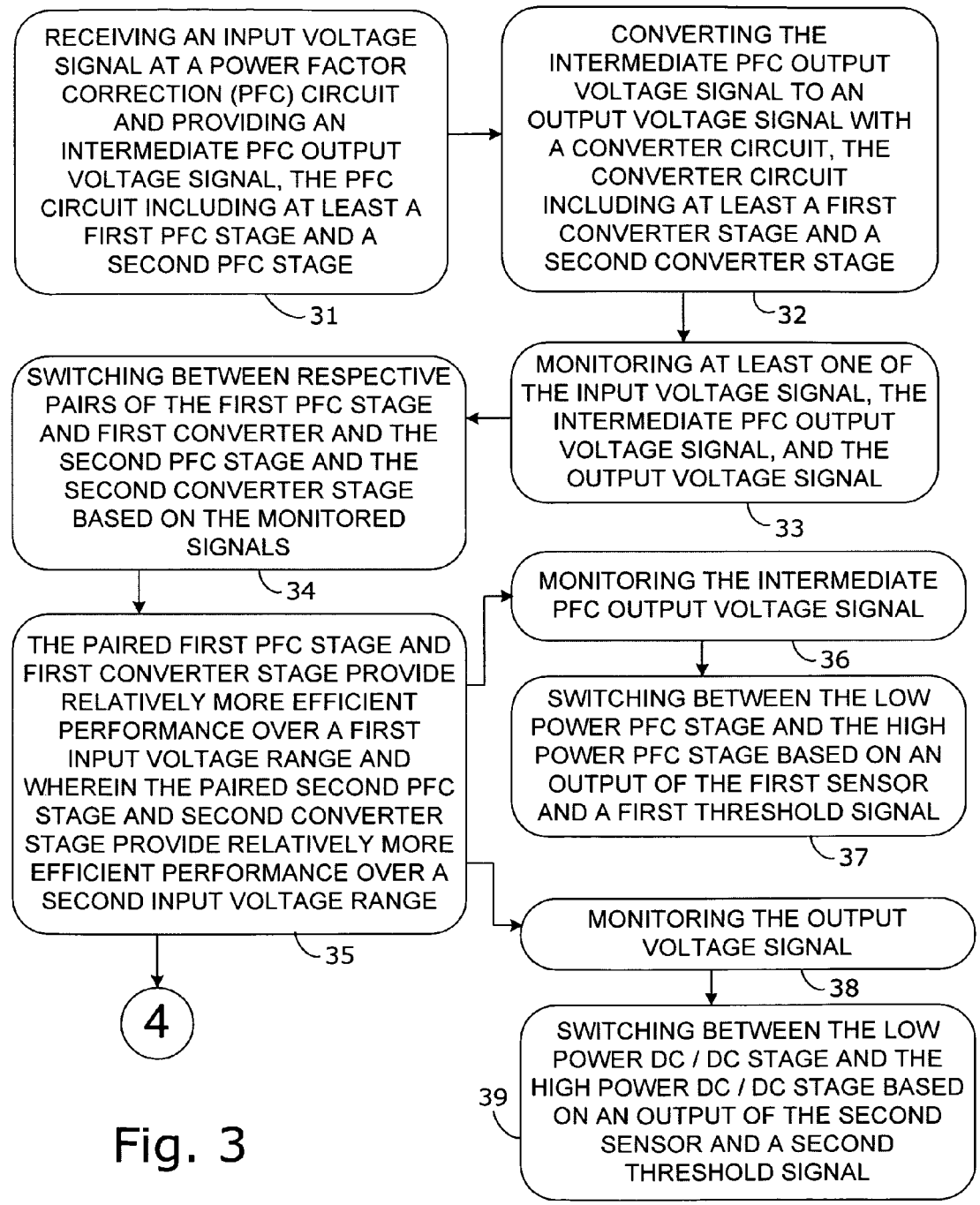
FIG. 3 is a flow diagram in accordance with some embodiments of the invention.

With reference to FIG. 3, in some embodiments of the invention a method of operating a power supply may include receiving an input voltage signal at a power factor correction (PFC) circuit and providing an intermediate PFC output voltage signal, the PFC circuit including at least a first PFC stage and a second PFC stage (e.g. at block 31), converting the intermediate PFC output voltage signal to an output voltage signal with a converter circuit, the converter circuit including at least a first converter stage and a second converter stage (e.g. at block 32), monitoring at least one of the input voltage signal, the intermediate PFC output voltage signal, and the output voltage signal (e.g. at block 33), and switching between respective pairs of the first PFC stage and first converter and the second PFC stage and the second converter stage based on the monitored signals (e.g. at block 34). For example, the paired first PFC stage and first converter stage may provide relatively more efficient performance over a first output power range and wherein the paired second PFC stage and second converter stage may provide relatively more efficient performance over a second output power range (e.g. at block 35).

For example, the first PFC stage may correspond to a low power PFC stage, the second PFC stage may correspond to a high power PFC stage, and the control circuit may include a PFC stage control circuit coupled to a first sensor. In some embodiments of the invention, the method may further include monitoring the intermediate PFC output voltage signal (e.g. at block 36), and switching between the low power PFC stage and the high power PFC stage based on an output of the first sensor and a first threshold signal (e.g. at block 37).

For example, the converter circuit may include a DC/DC converter, the first converter stage may correspond to a low power DC/DC stage, the second converter stage may correspond to a high power DC/DC stage, and the control circuit may include a DC/DC stage control circuit coupled to a second sensor. In some embodiments of the invention, the method may further include monitoring the output voltage signal (e.g. at block 38), and switching between the low power DC/DC stage and the high power DC/DC stage based on an output of the second sensor and a second threshold signal (e.g. at block 39).

Figure 4:
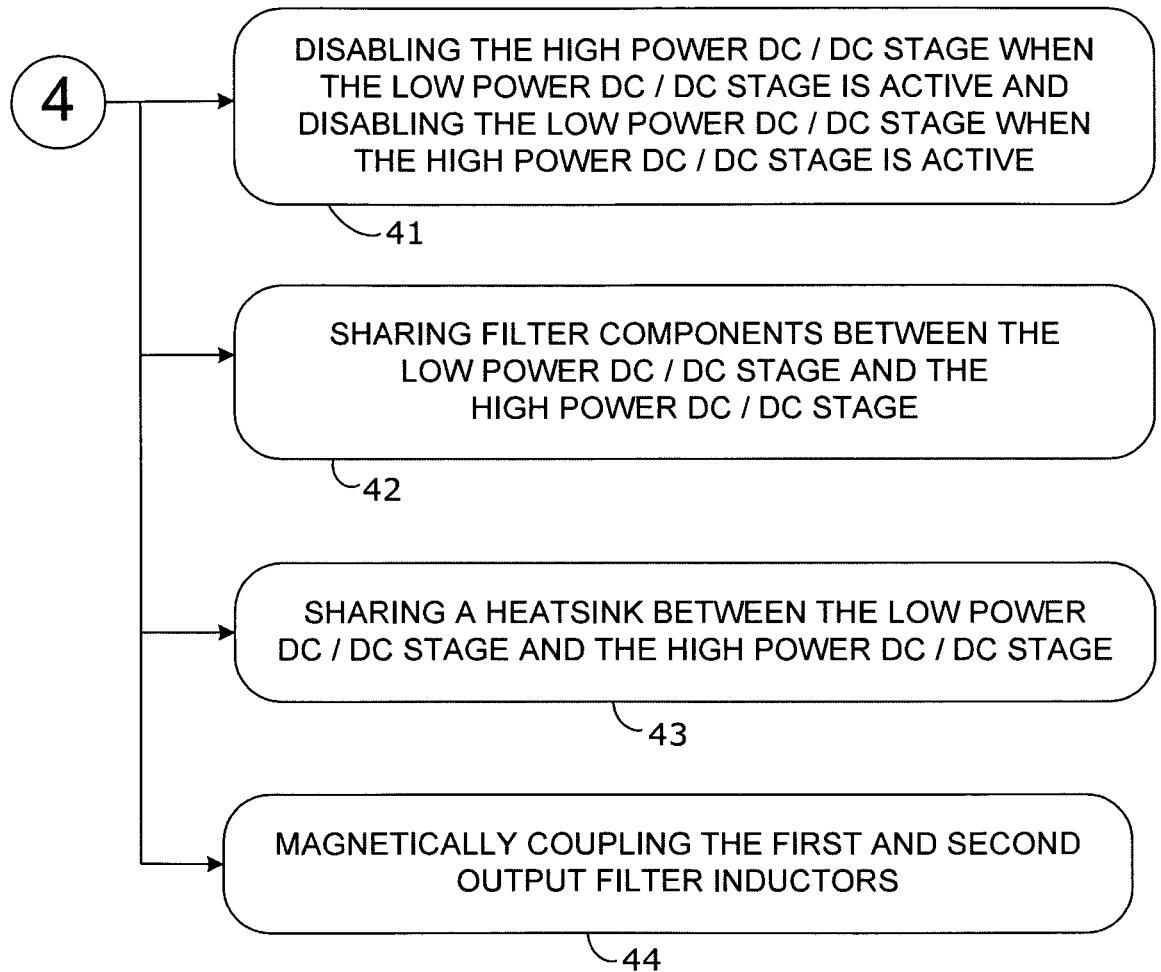
FIG. 4 is another flow diagram in accordance with some embodiments of the invention.

With reference to FIG. 4, some embodiments of the invention may further include disabling the high power DC/DC stage when the low power DC/DC stage is active and disabling the low power DC/DC stage when the high power DC/DC stage is active (e.g. at block 41). Some embodiments may further include sharing filter components between the low power DC/DC stage and the high power DC/DC stage (e.g. at block 42). Some embodiments may further include sharing a heatsink between the low power DC/DC stage and the high power DC/DC stage (e.g. at block 43). For example, the low power DC/DC stage may include a first output filter inductor and the high power DC/DC stage may include a second output filter inductor, and some embodiments of the invention may further include magnetically coupling the first and second output filter inductors (e.g. at block 44).

By way of background and without limiting the scope of the invention, in real datacenter applications server CPU average utilization may not exceed a 20-25% level, which is why most of the time a server power supply (PS) may be loaded to a small portion of its power rating. For redundant power supply configurations, where at least two power supplies share common load, average (typical) PS load additionally drops by a factor of two. Because of the low utilization rate and recent trend in platform idle power reduction, conventional system power supplies most of the time may operate at low power levels and therefore—as a result—at comparatively low efficiency. This significantly impacts server system wall power consumption at idle and reduces overall system performance per watt.

For example, the reason for PS efficiency reduction at light loads may be that power losses in the PS do not decrease when consumed power is reduced below a certain level. Because parasitic capacitance values along with magnetizing current magnitudes may remain unchanged over entire load rage, losses in the power MOSFETs and magnetic cores also may practically remain unaffected. Thus, at light loads fixed losses become practically the dominating factor affecting the power supply efficiency and causing it to roll down (e.g. to zero). Conventional load adaptive power supply technologies may allow the power supply to configure itself to a lower power state and to reduce its fixed losses. But these have not been widely adopted by industry, possibly because of an inability to provide desired PS efficiency over a wider operating load range (impacting high power level efficiencies).

Advantageously, some embodiments of the invention may provide a load adaptive power supply which provides good efficiency over a wide load range (e.g. high efficiency over the full load range). For example, in accordance with some embodiments of the invention, a power supply may include at least 2 cold swap DC/DC power stages and at least 2 cold swap power factor correction (PFC) stages inside the power supply module. For example, each stage may be designed for the high efficiency in a given power range. For example, if a high power stage (or stages) provide high efficiency in the range of 100-750 W, and a low power stage (or stages) provide high efficiency in the range of 15-100 W, then a power supply in accordance with some embodiments of the invention may provide high efficiency over a wide range from 2% to 100% load (e.g. the full load range for practical purposes).

Figure 5:
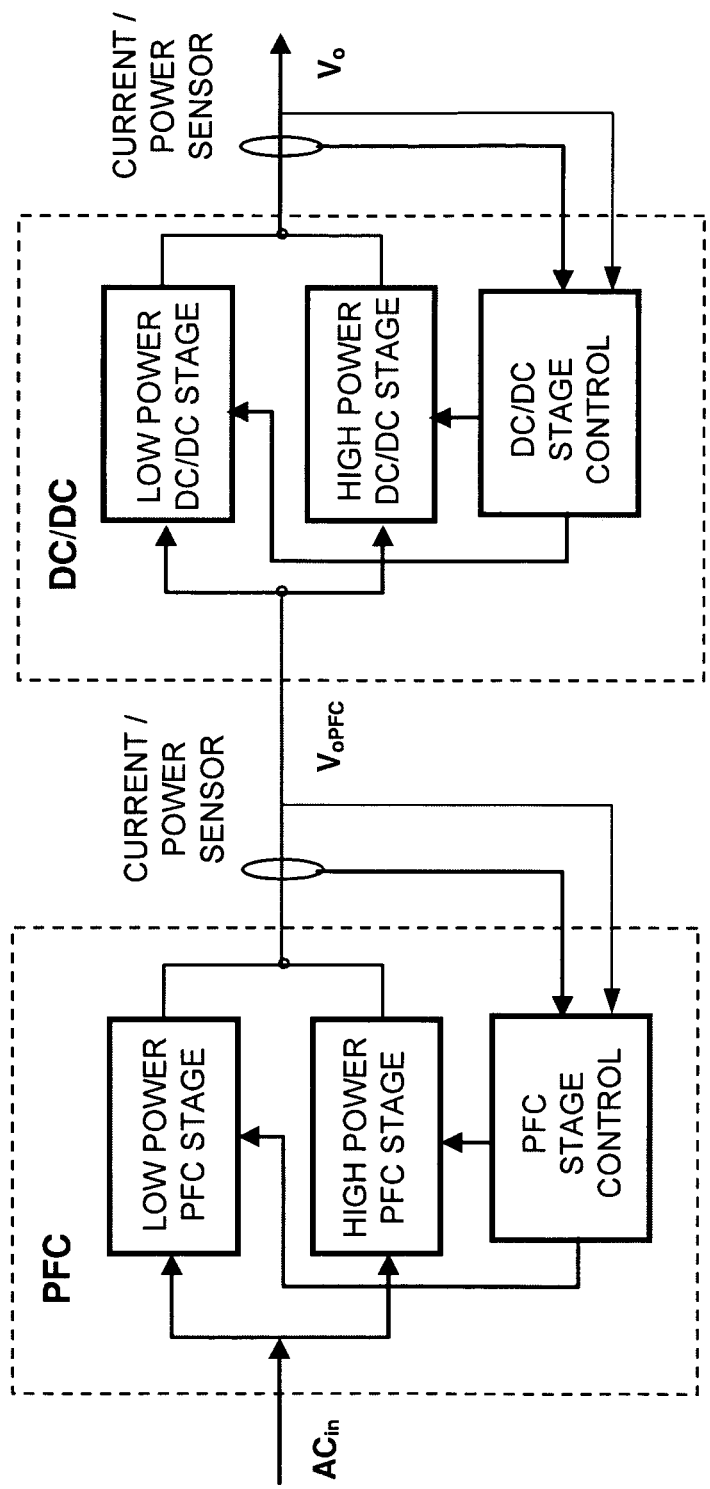
FIG. 5 is a block diagram of another power supply in accordance with some embodiments of the invention.

With reference to FIG. 5, in accordance with some embodiments of the invention a cold swap load adaptive power supply may include two output current sensors (PFC and DC/DC) to monitor currents drawn from the PFC and DC/DC stages respectively. For example, after any of these currents crosses a corresponding threshold level set by the respective control circuit, the control circuit activates the stage providing high efficiency at a given power level. At power levels below the threshold low power stage is active, at levels above the threshold—high power stage is active.

In some embodiments of the invention, the PFC circuit and the DC/DC circuit may operate independently of each other. For example, each of the respective PFC stage control circuit and the DC/DC stage control circuit have their own sensor and switch based on the signal received from their respective sensors. In some embodiments of the invention, a threshold value may be selected for each of the PFC stage control circuit and the DC/DC stage control circuit which corresponds to substantially the same power ranges (e.g. both control circuits switch to their respective low power stages under 150 W and both control circuits switch to their respective high power stages above 150 W).

In some embodiments of the invention, the threshold value for the PFC stage control circuit may correspond to a different power range as compared the threshold value for the DC/DC stage control circuit. For example, the threshold for the PFC stage control circuit may be 100 W while the threshold for the DC/DC stage control circuit may be 150 W. In this example, there are more than two power ranges and the high power PFC stage may operate together with the low power DC/DC stage over the range of 100 W to 150 W. In accordance with some embodiments of the invention, numerous other combinations are possible depending on which particular combination of PFC stage and DC/DC stage provide the best efficiency (or other desired operating characteristic) over a particular power range.

In some embodiments of the invention, the PFC circuit and the DC/DC circuit may be linked. For example, if the DC/DC output current sensor is represented by an isolating current transformer or if the DC/DC output current sensor is optically coupled to the PFC control circuit, a single sensor may be shared by both the PFC stage control circuit and the DC/DC stage control circuit.

Figure 6:
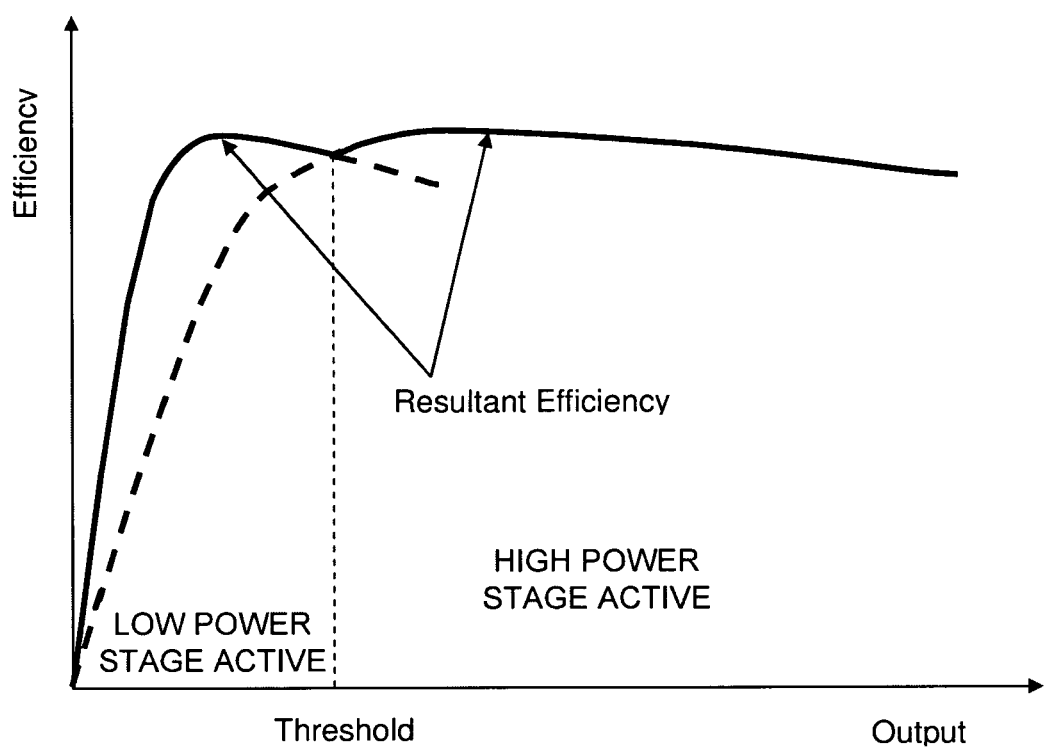
FIG. 6 is a graph of output versus efficiency in accordance with some embodiments of the invention.

With reference to FIG. 6, an efficiency chart illustrates how the low power stages are relatively more efficient in a lower range of output powers and the high power stages are relatively more efficient in a higher range of output powers. For example, a threshold value may be selected at a point where these two efficiency curves crossover, thereby providing a higher overall efficiency across the full range of output power by having the low power stage active below the threshold and the high power stage active above the threshold.

Figure 7:
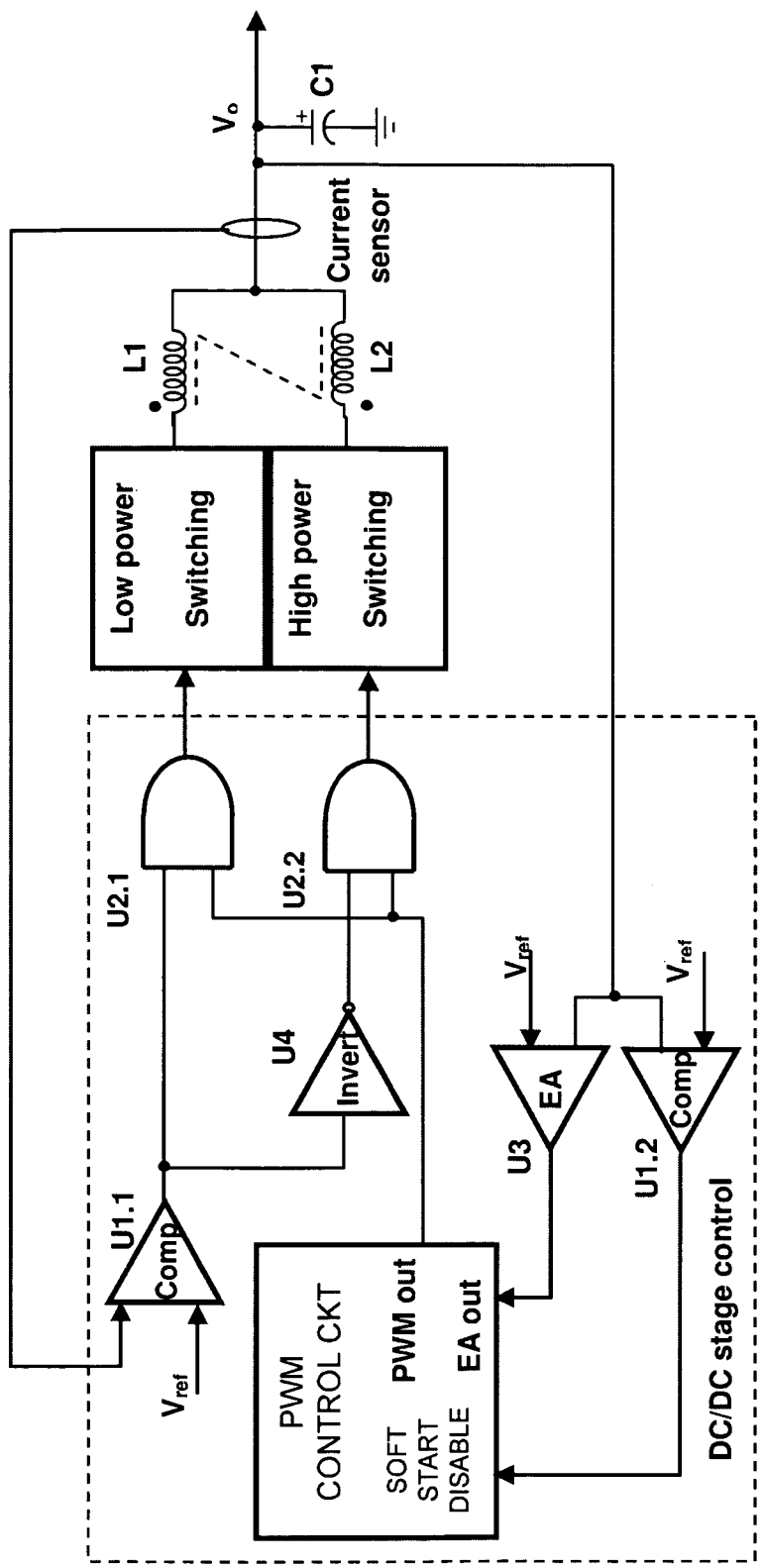
FIG. 7 is a block diagram of another power supply in accordance with some embodiments of the invention.

With reference to FIG. 7, a DC/DC control circuit may be configured to maintain an output voltage within regulation limits. For example, the circuit monitors the output voltage via an error amplifier (EA) U3 and compares it with reference voltage Vref. The output EA signal is provided to the pulse width modulator (PWM) control circuit, which generates control pulses for the power stages (e.g. isolated voltage regulators) and controls their duty cycle maintaining the output voltage constant.

When the PS is first powered on, its output voltage is zero and the PWM control gradually increases the duty cycle of the control voltage pulses providing a DC/DC power stage soft start. After the output voltage reaches a steady state level, the comparator U1.2 disables the soft start in the PWM controller. From this moment of time, the power stages may be activated substantially instantly without overstressing their power components. The control pulses, generated by the PWM, are routed to the two 2-input AND gates U2.1, U2.2, which outputs are coupled to the control inputs of the low power and high power DC/DC stages. The comparator U1.1 output is connected to one of the AND gates (U2.1) inputs directly and via inverter U4, inverting U1.1 output signal—to the second AND gate input. This circuit arrangement provides the PWM-control signal to only one power stage at a time. For example, the comparator U1.1 changes its output state each time the current sensor signal, proportional to the power consumed from the power stage, crosses a threshold Vref1. Which of the two power stages gets activated depends on the comparator output state, which is configured to activate the low power stage when the drawn current is below the threshold, and the high power stage when it is above the threshold.

Thus, the control logic provides power stage swapping without a delay and their cold status when they are inactive. When one of the stages is active, the other stage is disabled and dissipates little if any power. For example, to further speed up the transition process, the power stages may have their output filter inductors L1 and L2 magnetically coupled. Advantageously, during the transition time interval the filter inductor remains energized with the energy stored in its magnetic field, which allows easing the transient when the stages are being swapped.

The circuit and process for swapping (activating) the PFC stages may be similar to the DC/DC stage swapping circuit and process described above in connection with FIG. 7, except the PFC filter inductors may be connected to the input source (e.g. a bridge rectifier).

Figure 8:
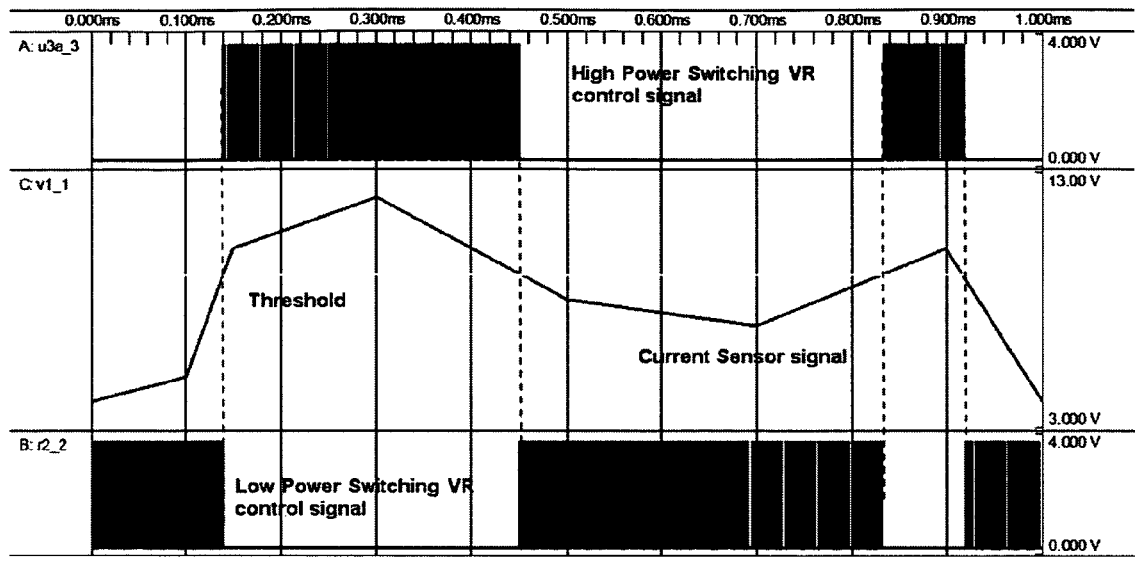
FIG. 8 is a graph showing various control signals is accordance with some embodiments of the invention.
Figure 9:
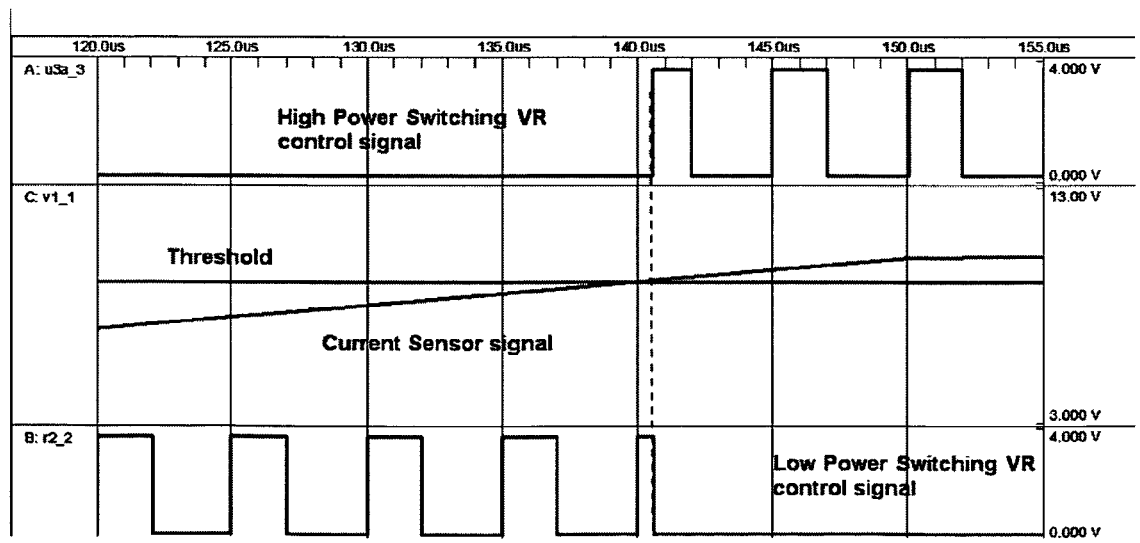
FIG. 9 is another graph showing various control signals in accordance with some embodiments of the invention.
Figure 10:
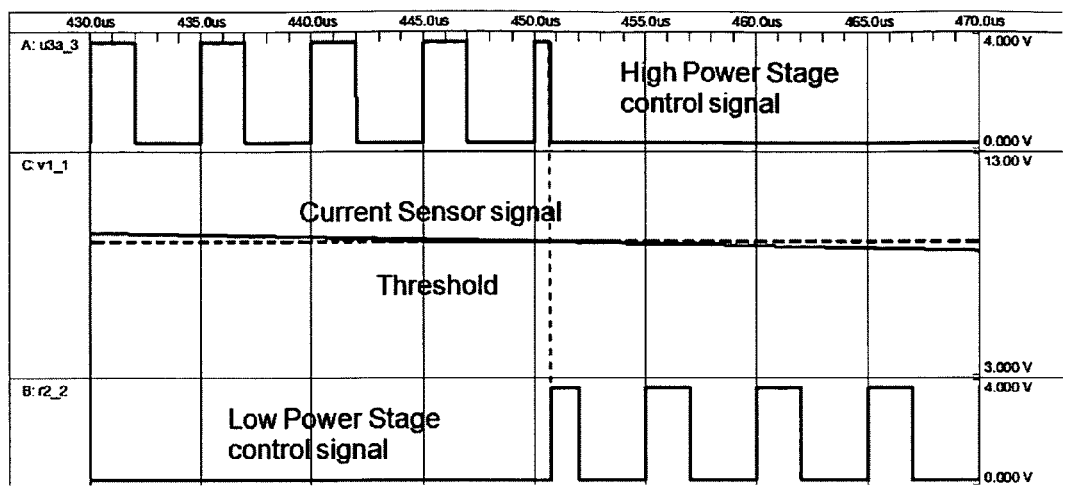
FIG. 10 is another graph showing various control signals in accordance with some embodiments of the invention.

FIGS. 8-12 represent simulation results with conventional components (comparator, inverter, gates) and typical switching frequencies (configured in accordance with the invention) and illustrate example signal and stages cold swap transition processes. FIG. 8 illustrates how the control signals may be transitioned when output power (current) varies in wide range and crosses the threshold while ramping up and down (with the dark regions corresponding to time when the corresponding stage is active). As shown in FIG. 8, the low power stage is active when the drawn current is below the threshold, and the high power stage is active when the current drawn is above the threshold. FIGS. 9 and 10 illustrate an example control signal path change process from low to high power stage input (e.g. FIG. 9) and back (e.g. FIG. 10).

Figure 11:
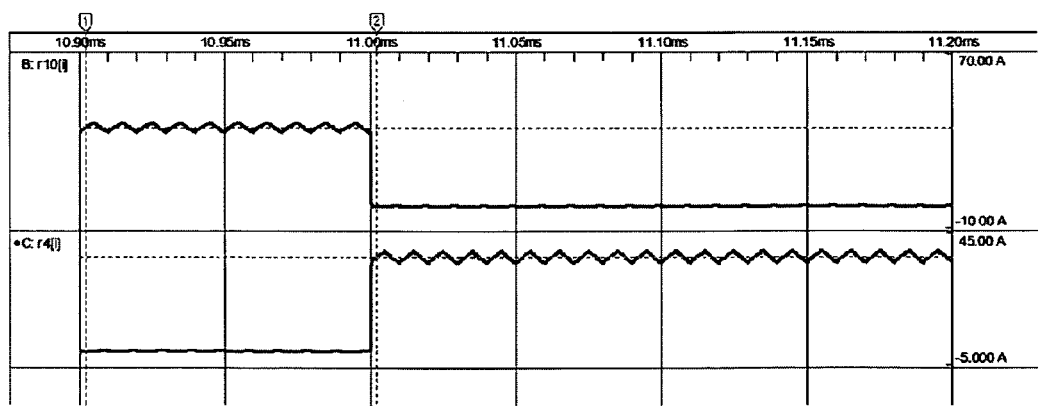
FIG. 11 is a graph of load transition in accordance with some embodiments of the invention.
Figure 12:
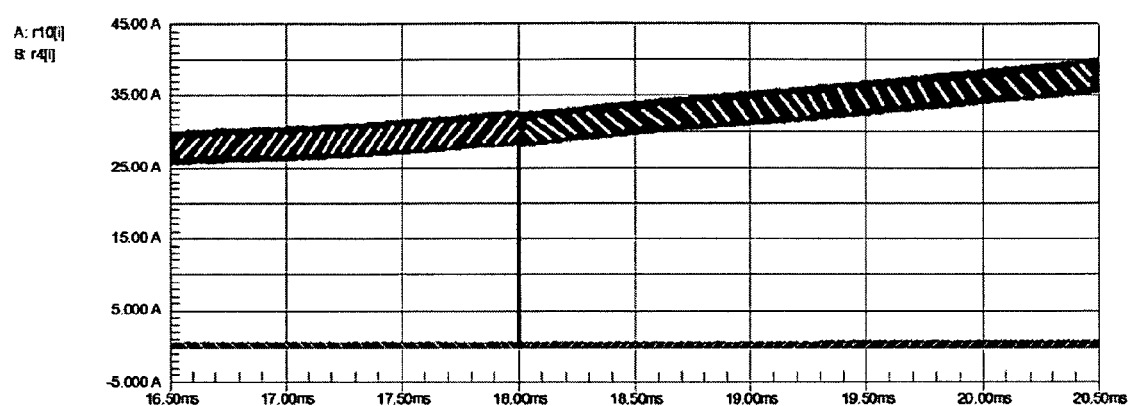
FIG. 12 is another graph of load transition in accordance with some embodiments of the invention.

FIGS. 11 and 12 illustrate that using coupled inductor windings makes the substantially instantaneous stage swapping smooth, without substantially any overshoot or oscillation. FIG. 11 shows an example load transition from low power to high power stage (inductor coupling coefficient k=0.99/L=15 uH, fsw=100 kHz) with a time scale of 50 us/div. FIG. 12 shows an example load transition from low power to high power stage (inductor coupling coefficient k=0.99/L=15 uH, fsw=100 kHz) with a time scale of 500 us/div. Both signals are shown side by side referenced to the same (zero) level.

Advantageously, in accordance with some embodiments of the invention each of the cold swap stages may operate at a high efficiency level in a given load range and since there may be reduced or no fixed losses in the disabled adjacent stage of the power supply. Advantageously, some embodiments of the invention may provide a high or maximum achievable efficiency level across a wide or the entire operating load range, starting from very light loads.

Some conventional power supplies utilize a lower power state to reduce its fixed losses based on using two- or multi-phase topology. At light loads the control circuit for these conventional power supplies may shed one or more phases while at heavy loads all phases are active. This technology may have one or more of the following drawbacks: high cost associated with usage of at least 2 high power transformers; low power density due to a requirement of supporting high peak loads during transition time intervals, limited efficiency improvements at light loads, and heavy load efficiency reduction (e.g. as compared to the optimized single stage designs).

Advantageously, one or more the above drawbacks may be overcome by some embodiments of the present invention. For example, some embodiments of the invention may use two cold swap optimized power stages, each of which could be instantly enabled or disabled depending on the operating power range. For example, one of the stages is low power rated (e.g. 10-15% of the high power stage rating) and may share the same PWM controller, the high power stage filter components and heatsinks (for example, because the stages do not operate at the same time). Advantageously, some power supplies in accordance with the invention may be comparatively low cost devices, and may practically achieve the power density of a single stage topologies. Another advantage is that some embodiments of the invention may provide two scalable SKU's with a single PCB. For example, for applications which don't require high efficiency at light loads, or continuously operate at heavy loads the low power stage components may not be stuffed, providing additional cost reduction for those applications.

Advantageously, some embodiments of the invention may virtually implements a cold redundancy feature employed in some redundant power subsystems, but inside a single power supply module with two unequally rated stages and magnetically coupled output inductor windings. Some embodiments of the invention may include two unequal power transformers, a two-winding inductor in the output filter circuit and provide high efficiency levels at very light loads (e.g. 2-10% of the PS max rating) as well as heavy loads.

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. A power supply, comprising:
a power factor correction (PFC) circuit to receive an input voltage signal and to provide an intermediate PFC output voltage signal, the PFC circuit including at least a first PFC stage and a second PFC stage;
a converter circuit to convert the intermediate PFC output voltage signal to an output voltage signal, the converter circuit including at least a first converter stage and a second converter stage; and
a control circuit to monitor at least one of the input voltage signal, the intermediate PFC output voltage signal, and the output voltage signal and to switch between respective pairs of the first PFC stage and first converter stage and the second PFC stage and the second converter stage based on the monitored signals,
wherein the paired first PFC stage and first converter stage provide relatively more efficient performance over a first output power range and wherein the paired second PFC stage and second converter stage provide relatively more efficient performance over a second output power range.

2. The power supply of claim 1, wherein the first PFC stage corresponds to a low power PFC stage, the second PFC stage corresponds to a high power PFC stage, and the control circuit includes a PFC stage control circuit coupled to the intermediate PFC output voltage signal, and a first sensor to monitor output PFC stage current, wherein the PFC stage control circuit is configured to switch between the low power PFC stage and the high power PFC stage based on an output of the first sensor and a first threshold signal.

3. The power supply of claim 2, wherein the converter circuit includes a direct current to direct current (DC/DC) converter and the first converter stage corresponds to a low power DC/DC stage, the second converter stage corresponds to a high power DC/DC stage, and the control circuit includes a DC/DC stage control circuit coupled to the output voltage signal, and to a second sensor to monitor the DC/DC stage output current, and wherein the DC/DC stage control circuit is configured to switch between the low power DC/DC stage and the high power DC/DC stage based on an output of the second sensor and a second threshold signal.

4. The power supply of claim 3, wherein the DC/DC stage control circuit is configured to disable the high power DC/DC stage when the low power DC/DC stage is active and to disable the low power DC/DC stage when the high power DC/DC stage is active.

5. The power supply of claim 3, wherein the low power DC/DC stage shares filter components with the high power DC/DC stage.

6. The power supply of claim 4, wherein the low power DC/DC stage shares a heatsink with the high power DC/DC stage.

7. The power supply of claim 4, wherein the low power DC/DC stage includes a first output filter inductor and the high power DC/DC stage includes a second output filter inductor and wherein the first and second output filter inductors are configured to be magnetically coupled.

8. A method of operating a power supply, comprising:
receiving an input voltage signal at a power factor correction (PFC) circuit and providing an intermediate PFC output voltage signal, the PFC circuit including at least a first PFC stage and a second PFC stage;
converting the intermediate PFC output voltage signal to an output voltage signal with a converter circuit, the converter circuit including at least a first converter stage and a second converter stage;
monitoring at least one of the input voltage signal, the intermediate PFC output voltage signal, and the output voltage signal; and
switching between respective pairs of the first PFC stage and first converter stage and the second PFC stage and the second converter stage based on the monitored signals,
wherein the paired first PFC stage and first converter stage provide relatively more efficient performance over a first output power range and wherein the paired second PFC stage and second converter stage provide relatively more efficient performance over a second output power range.

9. The method of operating a power supply of claim 8, wherein the first PFC stage corresponds to a low power PFC stage, the second PFC stage corresponds to a high power PFC stage, and the control circuit includes a PFC stage control circuit coupled to a first sensor, the method further comprising:

monitoring the intermediate PFC output current signal; and switching between the low power PFC stage and the high power PFC stage based on an output of the first sensor and a first threshold signal.

10. The method of operating a power supply of claim 9, wherein the converter circuit includes a direct current to direct current (DC/DC) converter and the first converter stage corresponds to a low power DC/DC stage, the second converter stage corresponds to a high power DC/DC stage, and the control circuit includes a DC/DC stage control circuit coupled to a second sensor, the method further comprising:

monitoring the output current signal, and switching between the low power DC/DC stage and the high power DC/DC stage based on an output of the second sensor and a second threshold signal.

11. The method of operating a power supply of claim 10, further comprising:

disabling the high power DC/DC stage when the low power DC/DC stage is active and disabling the low power DC/DC stage when the high power DC/DC stage is active.

12. The method of operating a power supply of claim 11, further comprising:

sharing filter components between the low power DC/DC stage and the high power DC/DC stage.

13. The method of operating a power supply of claim 10, further comprising:

sharing a heatsink between the low power DC/DC stage and the high power DC/DC stage.

14. The method of operating a power supply of claim 10, wherein the low power DC/DC stage includes a first output filter inductor and the high power DC/DC stage includes a second output filter inductor, the method further comprising:

magnetically coupling the first and second output filter inductors.

15. A server system, comprising:

a processor having at least one processor core;

memory in communication with the processor; and a load adaptive power supply unit to provide power to the server system, the load adaptive power supply unit including:

a power factor correction (PFC) circuit to receive an input voltage signal and to provide an intermediate PFC output voltage signal, the PFC circuit including at least a first PFC stage and a second PFC stage;

a converter circuit to convert the intermediate PFC output voltage signal to an output voltage signal, the converter circuit including at least a first converter stage and a second converter stage; and a control circuit to monitor at least one of the input voltage signal, the intermediate PFC output voltage signal, and the output voltage signal and to switch between respective pairs of the first PFC stage and first converter stage and the second PFC stage and the second converter stage based on the monitored signals, wherein the paired first PFC stage and first converter stage provide relatively more efficient performance over a first output power range and wherein the paired second PFC stage and second converter stage provide relatively more efficient performance over a second output power range.

16. The server system of claim 15, wherein the first PFC stage corresponds to a low power PFC stage, the second PFC stage corresponds to a high power PFC stage, and the control circuit includes a PFC stage control circuit coupled to monitor the intermediate PFC output voltage signal, and a first sensor to monitor output current of the PFC stage and wherein the PFC stage control circuit is configured to switch between the low power PFC stage and the high power PFC stage based on an output of the first sensor and a first threshold signal.

17. The server system of claim 16, wherein the converter circuit includes a direct current to direct current (DC/DC) converter and the first converter stage corresponds to a low power DC/DC stage, the second converter stage corresponds to a high power DC/DC stage, and the control circuit includes a DC/DC stage control circuit coupled to the output voltage signal, and a second sensor to monitor output current of the DC/DC stage wherein the DC/DC stage control circuit is configured to switch between the low power DC/DC stage and the high power DC/DC stage based on an output of the second sensor and a second threshold signal.

18. The server system of claim 17, wherein the DC/DC stage control circuit is configured to disable the high power DC/DC stage when the low power DC/DC stage is active and to disable the low power DC/DC stage when the high power DC/DC stage is active.

19. The server system of claim 18, wherein the low power DC/DC stage shares filter components with the high power DC/DC stage.

20. The server system of claim 19, wherein the low power DC/DC stage shares a heatsink with the high power DC/DC stage.

21. The server system of claim 19, wherein the low power DC/DC stage includes a first output filter inductor and the high power DC/DC stage includes a second output filter inductor and wherein the first and second output filter inductors are configured to be magnetically coupled.

* * * * *